United States Patent

Gillilan

[11] 4,229,633
[45] Oct. 21, 1980

[54] PROGRAMMABLE SWITCH

[76] Inventor: Edward L. Gillilan, 3251 Cypress Creek Rd., Pompano Beach, Fla. 33062

[21] Appl. No.: 890,123

[22] Filed: Mar. 27, 1978

[51] Int. Cl.$^2$ .................. H01H 13/52; H01H 13/06
[52] U.S. Cl. ........................ 200/159 B; 200/292; 200/5 A; 340/365 R
[58] Field of Search ............. 200/159 B, 292, 5 A, 200/5 R; 340/712, 590, 365 R, 365 A

[56] References Cited

U.S. PATENT DOCUMENTS

| | | | |
|---|---|---|---|
| 3,503,031 | 3/1970 | Nyhus et al. | 200/292 X |
| 3,584,162 | 6/1971 | Krakinowski | 340/365 A |
| 3,745,287 | 7/1973 | Walker | 200/292 X |
| 3,760,137 | 9/1973 | Shimojo et al. | 200/159 B X |
| 3,968,336 | 7/1976 | Johnson | 200/292 X |

*Primary Examiner*—Joseph Man-Fu Moy
*Attorney, Agent, or Firm*—Eugene F. Malin; Barry L. Haley; Philip R. Wadsworth

[57] ABSTRACT

A programmable switch in the form of an output display similar to those generally known in the art as a seven-segment display used for digital display of output. This programmable switch provides a plurality of segments that can operate as a switch to generate a numerical or alphabetical program for entry into an electronic program circuit. The plurality of segments are recessed into the face of the switch body so that a stylus instrument can be inserted into the recess of individual segments to generate in each switch body the desired number, letter or other symbol. A plurality of switch bodies may be positioned adjacent one another to increase the number of digits or indicia to be entered into an electronic program circuit. For all segments there is one conductive layer which acts as the "common" side of the electric circuit. Beneath the conductive layer is a segmented printed circuit which is contacted by the "common" side conductive layer when a stylus instrument is inserted into a recess of a switch segment. One common can serve all the switch segments. One version has an open-cell foam layer between the "common" conductive layer and the printed circuit board for electrical isolation between the common and printed circuit prior to actuation of a switch by insertion of the stylus into the segment.

4 Claims, 6 Drawing Figures

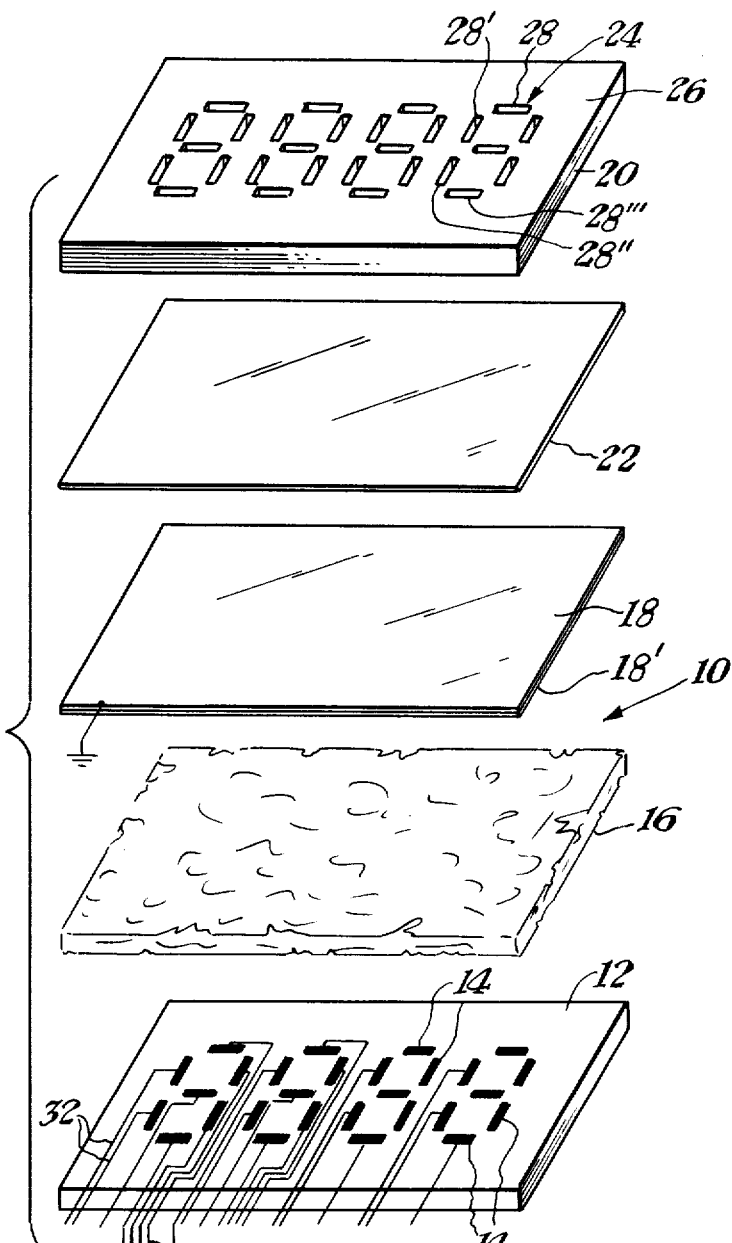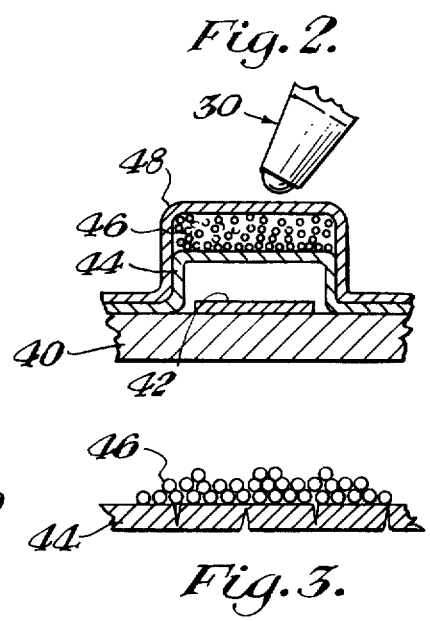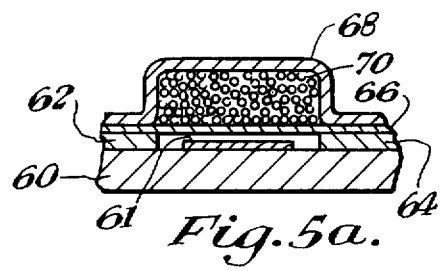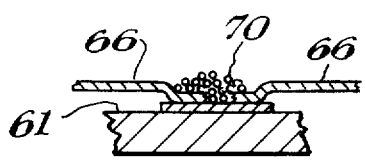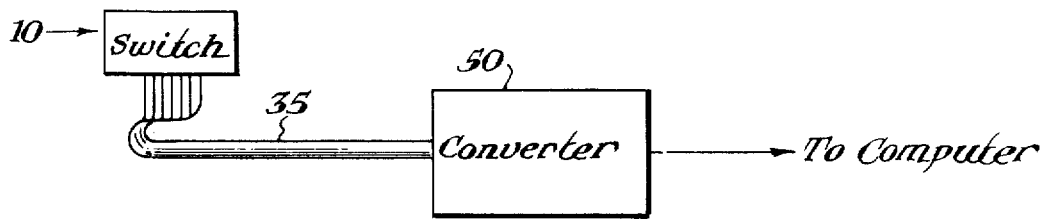

PROGRAMMABLE SWITCH

BACKGROUND OF THE INVENTION

Although the invention described and claimed herein may be directed to a variety of applications, it is herein described in connection with application to communicating with a computer or other electronic logic by way of a disposable, programmable input switch that is in a readily acceptable form. Particularly with more numerous usage of coded programs, it has become increasingly necessary to provide a simple system for inputing symbols and numbers that represent data or instructions into a computer, while maintaining a visual display of the data or instruction communicated to the equipment. Heretofore, any variable input code must be recalled by a manual output operation to insure the proper code has been entered into the program. Most combination keyboard input and display devices are expensive and complex. Most, also must be provided a new input after a power-off condition.

SUMMARY OF THE INVENTION

The present programmable switch invention provides an improved solution to the means of providing communication to a computer of variable information while retaining a constantly visible indication of the stored instructure or data. A disposable programmable switch allows the input data or information to be varied at low cost. A resettable version could be provided where numerous program changes are anticipated. The programmable switch is in the form of a well known seven-segment numerical display, or more. The segments are recessed into the face of the switch body so that a stylus instrument can be inserted into said recesses to generate a desired input number or symbol which is connected for entry into an electronic program circuit.

A plurality of switch bodies may be positioned adjacent one another to increase the number of digits or indicia to be entered into an electronic program circuit. For the segments there is a conductive layer which acts as the "common" side of the electric circuit. Beneath the conductive layer is a segmented printed circuit which is contacted by the "common" side conductive layer when a stylus instrument is inserted into a segment recess of one switch body. There is an open-cell foam layer between the common conductive layer and the printed circuit board for electrical isolation between the common and printed circuit prior to actuation of a switch by insertion of the stylus into the segment. The common layer and printed circuit can be held together as a closed switch, or the fact that they came into contact can be remembered by circuits elsewhere in the application.

It is therefore the principal object of this invention to provide non-complex switch means for entering information into an electronic circuit for processing.

It is a further object of this invention to provide a permanent, visual display of the information entered into a computer.

It is another object of this invention to provide a means for removing data from a computer and inputing different data into said computer by removing a non-complex coded throwaway switch and replacing the removed switch with another switch.

It is still a further object of this invention to provide a programmable non-complex switch of the throw away type.

It is still another object of this invention to be so configured as to be acceptable to standard, popular connectors presently available.

Other objects and advantages of the invention will be apparent from the following description, the accompanying drawings and the appended claims.

BRIEF DESCRIPTION OF THE DRAWINGS

In the drawings,

FIG. 1 is an exploded illustration of the switch.

FIG. 2 is a cross-section side view of the switch.

FIG. 3 is an enlarged view of a portion of the switch.

FIG. 4 is a block diagram of an interface that is usable between the programmable switch and a computer.

FIG. 5a is an enlargement cross-sectional view of another switch embodiment.

FIG. 5b is an enlarged view of a portion of the switch shown in FIG. 5a.

DESCRIPTION OF THE PREFERRED EMBODIMENTS

Referring to FIG. 1, a programmable switch 10 somewhat similar in appearance to devices generally known in the art as seven-segment displays. The switch is shown in exploded view and includes a printed circuit board 12 with copper or similar conductive material as a circuit trace 14, an open cell plastic foam or similar type separator 16 to isolate the common and printed circuit 14 prior to actuation by a stylus means 30 (shown in FIG. 2). A layer of conductive material 18 such as copper foil, a protective and insulative material 22, and a switch housing 20 with a plurality of segments 24 which can be acted on by a stylus means 30 for the generation of an alphabetical or numerical program. The segments 24 are generally recessed as shown at 28, 28', 28", and 28"' into the face 26 of said switch housing 20, thus a stylus means 30 can be easily inserted into said recess 28, 28', 28", and 28"' to operate a switch means, by the mating of the conductive material 18 and the conductive trace 14 on the printed circuit board 12, for entry of a programmed signal into an electronic circuit. After the programmed signal has been inputed into the logic circuit, the switch face 26 maintains a visible display of the code that has been entered into the logic circuit. The stylus means 30 may leave an ink or other indicia on the segments. Thereafter, upon a loss of power to the programmed device, the programmed signal will again be automatically entered into the program upon recovery of electrical power, due to an adhesive conductive coating 18' on the bottom of the conductive layer 18 causing it to remain in contact with the circuit trace 14. The adhesive coating may be protected by a non-conductive liquid covering.

The printed board 12 includes leads 32 to each trace. The connectors 34 may be IC sockets or printed circuit board edge-connectors such as sold by BURNDY, 1C sockets identified as low profile P-1, high performance P-108, etc., or Stanford Applied Engineering PC connectors such as series 7000/7001.

A plurality of programmable switches 10 may be positioned relative to each other to increase the number of indicia to be entered into an electronic logic circuit.

Another embodiment of this invention as shown in FIGS. 2 and 3, includes a printred circuit board 40 with a conductive trace 42 thereupon, a scored non-conductive separator 44, a flowable conductive material 46, and a switch housing 48 with a plurality of recessed segments for actuation by a stylus means of a coded input into an electronic logic circuit.

The switch 10 may be read by a plurality of devices. The connectors 34 of switch 10 are attached to a connector means 35 in FIG. 4. The connector means 35 is connected to an interface 50 such as a 7-segment to BCD converter 86L25 Binary coded device sold by National Semiconductor. This interface allows the written in numerals to be converted to binary-encoded decimal encoded decimal encoding for readability by a computer.

Still another embodiment, as shown in FIGS. 5a and 5b, combines features of FIG. 1 and FIG. 2, in that a conductive foil layer 66 is fractured when stylus pressure is applied on 68 and through 70 to place pressure on the foil 66 over the recesses. This causes the flowable conductive material 70, such as aluminum power, to come into contact with both the printed circuit trace 61 and the foil layer 66 simultaneously. The foil layer 66 is the common for all switch segments.

While the form of the invention herein described constitutes a preferred embodiment of this invention, it is to be understood that the invention is not limited to this precise form, and that changes may be made therein without departing from the scope of the invention.

What is claimed is:

1. An indelibly inscribable programmable switch assembly for use with an electrical circuit, comprising:
   at least one switch body, each said switch body; and
   at least one indelibly inscribable switch means operable by indelibly inscribing on said inscribable switch, said inscribable switch connected to said switch body;
   said switch body including a carrier means connected to said body adjacent said inscribable switch;
   said inscribable switch including an indelibly inscribable means, a first conductive means and a second conductive means, said first conductive means positioned between said inscribable means and said second conductive means;
   said first conductive means and said second conductive means for providing switching elements;
   said second conductive means connected to said carrier means, said first conductive means and said inscribable means connected to said switch body, said second conductive means positioned for electrical switching relative to said first conductive means, said inscribable means for indelibly inscribing indicia thereon by deforming said inscribable means and moving said first conductive means to provide a switched marking when switching said inscribable switch means,
   said inscribable means positioned to be accessible through said switch body for movement of said first conductive means relative to said second conductive means for switching;
   said first conductive means and said second conductive means form an electrical circuit when said first conductive means is in electrical contact with said second conductive means;
   said second conductive means including at least one electrical contact surface;
   each said contact surface separately connectable to separate terminal means;
   said first conductive means separately connectable to a separate terminal means; and
   insulation means located between said first conductive means and said second conductive means when in an open position.

2. An inscribable programmable switch assembly as set forth in claim 1, wherein:
   said switch body includes at least one surface portion with at least one aperture therein to provide access to inscribe and switch said inscribable switch;
   said carrier means is circuit board;
   said second conductive means is a printed circuit connected to said circuit board, said second conductive means including a plurality of contact surfaces printed on said circuit board and positioned directly below said aperture of said switch body for contact with said first conductive means when said first conductive means is inscribed upon and switched by an inscribing and switching device.

3. An inscribable programmable switch assembly as set forth in claim 2, wherein:
   said first conductive means includes an adhesive means to permanently connect said first conductive means to said plurality of contact surfaces of second conductive means when they are brought into contact with one another;
   said inscribable means for one way movement without return.

4. An inscribable programmable switch assembly for use with an electrical circuit comprising:
   at least one switch body, each said switch body including at least one inscribable switch in said body,
   a carrier means connected to said body,
   said switch including a first conductive means and a second conductive means,
   said second conductive means connected to said carrier means, said first conductive means connected to said switch body, said first conductive means positioned from said second conductive means and accessible through said switch body for movement toward said second conductive means;
   said first conductive means and said second conductive means form an electrical circuit when said first conductive means is places in electrical contact with said second conductive means;
   said second conductive means including a plurality of electrical contact surfaces;
   at least two of said contact surfaces separately connectable to separate terminal means;
   said first conductive means connected to a separate terminal means; and
   insulation means normally located between said first conductive means and said second conductive means,
   said first conductive means is at least partially destructible;
   a conductive material positioned over said first conductive means;
   a cover means connected to said body over said conductive material, said cover means is inscribable by a stylus for at least partial destruction of said first conductive means to place the conductive material in electrical contact between said first conductive means and said second conductive means.

* * * * *